(12) United States Patent
Pollard et al.

(10) Patent No.: US 9,212,313 B2
(45) Date of Patent: Dec. 15, 2015

(54) METHODS, APPARATUS, AND SYSTEMS FOR INCORPORATING BIO-DERIVED MATERIALS INTO OIL SANDS PROCESSING

(75) Inventors: Anthony J. S. Pollard, Ames, IA (US); Dennis S. Banasiak, Urbandale, IA (US); Cody J. Ellens, Ankeny, IA (US); Jared N. Brown, Ankeny, IA (US)

(73) Assignee: Avello Bioenergy, Inc., Des Moines, IA (US)

( * ) Notice: Subject to any disclaimer, the term of this patent is extended or adjusted under 35 U.S.C. 154(b) by 653 days.

(21) Appl. No.: 13/470,991

(22) Filed: May 14, 2012

(65) Prior Publication Data

US 2012/0289440 A1    Nov. 15, 2012

Related U.S. Application Data

(60) Provisional application No. 61/486,304, filed on May 15, 2011.

(51) Int. Cl.
| | |
|---|---|
| *C10C 3/00* | (2006.01) |
| *C10G 1/04* | (2006.01) |
| *C10G 1/00* | (2006.01) |
| *C10B 33/00* | (2006.01) |
| *B02C 23/22* | (2006.01) |
| *E21B 43/28* | (2006.01) |
| *C10C 5/00* | (2006.01) |

(52) U.S. Cl.
CPC ............ *C10G 1/00* (2013.01); *B03D 2203/006* (2013.01); *C10C 5/00* (2013.01); *C10G 2300/802* (2013.01); *C10G 2300/805* (2013.01); *Y02E 50/14* (2013.01)

(58) Field of Classification Search
CPC ............... C10C 3/005; C10G 1/04; C10G 2300/1011–2300/1018; Y02E 50/00
USPC ............... 508/110; 201/41; 241/61; 299/5; 208/23, 390, 400, 427; 585/240
See application file for complete search history.

(56) References Cited

U.S. PATENT DOCUMENTS 6,096,192 A * 8/2000 Myers et al. ............... 208/108
2003/0212168 A1 * 11/2003 White et al. ............... 524/59

* cited by examiner

*Primary Examiner* — Vishal Vasisth
(74) *Attorney, Agent, or Firm* — O'Connor & Company

(57) ABSTRACT

Methods, processes, apparatus, systems, and compositions are disclosed for improving the sustainability of oil sands processing. In some embodiments, bitumen is combined with biodiluent comprising one or more liquid pyrolysis fractions obtained from pyrolyzing biomass and collecting multiple liquid fractions. The bitumen may be any source of bitumen, such as bitumen obtained from oil sands. In some embodiments, a water-rich pyrolysis liquid displaces water use in an oil sands process. The water-rich pyrolysis liquid may be used for primary separation of bitumen from oil sands or for hydrotransport, for example. Also, biochar produced from biomass pyrolysis may be introduced to an oil sands tailing pond with various benefits. Water may be recycled from a tailing pond. Integration of a pyrolysis and separation process into an oil sands refining process reduces the overall greenhouse-gas emissions on a well-to-refined product basis by 10-70% or more. Various compositions and products are also disclosed.

13 Claims, 3 Drawing Sheets

METHODS, APPARATUS, AND SYSTEMS FOR INCORPORATING BIO-DERIVED MATERIALS INTO OIL SANDS PROCESSING

PRIORITY DATA

This patent application claims priority under 35 U.S.C. §120 from U.S. Provisional Patent Application No. 61/486,304, filed May 15, 2011, the disclosure of which is hereby incorporated by reference herein for all purposes.

FIELD OF THE INVENTION

The present invention generally relates to methods, apparatus, and systems for integrating bio-derived materials into oil sands processing to reduce carbon footprint and produce chemicals, materials, and fuels.

BACKGROUND OF THE INVENTION

Crude oil is a fossil-based resource used for the production of transportation fuels, heat and power, asphalt, chemicals, adhesives, pharmaceuticals, polymers, fibers and other products. The United States is a major importer of crude oil and thus is heavily reliant on foreign countries to meet demand. Dependence on foreign oil has massive implications on national security.

National concerns over greenhouse gas emissions, carbon footprint, sustainability and the environment have grown parallel to our need for energy independence. Consequently, interest in renewable energy technologies that reduce dependence on foreign oil and lower carbon footprint has amplified, playing a noteworthy role in federal energy policy. Nonetheless, renewable energy can only supply a small fraction of total US energy consumption obligating continued crude oil imports.

Canada is the single largest exporter of crude oil into the United States making up nearly one quarter of annual crude oil imports in 2010. Over 95% of Canadian crude oil reserves are located in the province of Alberta in the form of oil sands deposits.

Oil sands are a mixture of sand, clay, water and bitumen found naturally all over the world. Bitumen, a viscous, heavy crude oil that will not flow unless heated or blended with diluent, represents about 12% of the oil sands mixture. Alberta is second only to Saudi Arabia in proven oil reserves retaining about 13% of total global reserves as of 2011 (Oil Sands Discovery Centre).

Oil sands cannot be pumped or extracted using traditional oil production methods. Instead, mining and in situ extraction methods are used to recover bitumen. Twenty percent of Canadian oil sands reserves are minable since they are within 75 meters of the surface while the remaining 80% must be recovered using in situ techniques.

One of the criticisms of oil sands production is that mining and in situ extraction techniques use more energy than traditional crude oil production. Largely because of this oil sands derived bitumen has between 5 and 15% higher greenhouse gas (GHG) emissions than average crude consumed in the US during the year 2005 (Hobbs, Brukhard, Gross, Forrest, & Groode, 2010).

A challenge for oil sands processing is that mining and in situ extraction use large amounts of water. Mining uses between three and four barrels of water per barrel of bitumen. Hot water is needed to transport oil sands and separate bitumen from clay and sand. In situ processing uses about one barrel of water per barrel of bitumen and requires substantial amounts of energy to create steam for melting bitumen underground.

Another challenge is that mining extraction requires large tailing ponds that take decades to reclaim as natural habitat and useable 1 and. Tailing ponds retain residual bitumen, water, sand and clay after separation from bitumen. Tailing ponds are made up of three primary layers: heavy sand on the bottom, relatively clean water on top and fine solids suspended in water (mature fine tailings) in the middle layer. It takes many years for fine solids to settle out and for the surface to become dry and stable enough to support equipment before tailing pond reclamation can begin (Shell Canada Limited, 2009).

Another challenge is the use of hydrocarbon diluents in bitumen transportation and chemicals to aid in bitumen separation. Mining and in situ extraction use hydrocarbon diluent to reduce bitumen viscosity and meet pipeline specifications for pipeline transport. Pipeline specifications for functional performance require a maximum crude density of 940 $kg/m^3$ measured at 15° C. and a maximum crude viscosity of 940 cSt measured at a particular reference temperature depending on the season. Hydrocarbon diluent is composed of hydrocarbon compounds including butanes, pentanes, hexanes, heptanes, octanes, nonanes, and aromatic and cyclic hydrocarbons including benzene, toluene and xylene (Advantage Insight Group, 2007). Environmental and health concerns are associated with these products which increase the carbon footprint of the oil sand extraction process. Up to 30% vol. diluent may be added to a barrel of bitumen to meet pipeline specifications. Since diluent is not readily available near oil sands production sites it must be purchased and shipped in using pipelines or rail which adds cost and infrastructure. Furthermore, if bitumen is shipped overseas it may not be economical to ship diluent back.

Mining extraction uses additional chemicals to facilitate separation of bitumen from water, sand and clay. Typically a base (NaOH) is added with the water to produce (saponify) natural surfactants from the bitumen. This improves the separation of bitumen from oil sands minerals even though 90% of the base reacts to form bicarbonate (Schramm, Stasiuk, Yarranton, Maini, & Shelfantook, 2001).

Another challenge for oil sands bitumen is to reduce its GHG emission profile such that it meets the California Low Carbon Fuel Standard specifications and is accepted into California (Cackette, 2011).

Another challenge is using renewable energy, specifically conventional fast pyrolysis products to reduce GHG emission profile in the oil sands extraction process. Conventional bio-oil has high water content between 15-30% and high oxygen content between 35-50% making it immiscible with hydrocarbons. Conventional bio-oil also has acidic properties which limit its integration with existing equipment and processes. For example, US Patent Application Pub. No. 2011/0232164 A1 describes a process whereby biomass pyrolysis oil is used as a co-feed for a heavy petroleum oil coking process to improve operation by reducing coke drying time and improve coke handling. It is noted however that pyrolysis oil contains high oxygen which precludes it from being a direct hydrocarbon substitute though it may be soluble in high asphaltene-containing feedstocks used in coking.

Another challenge is to cost effectively separate conventional bio-oil into its aqueous (water-rich) and organic phases so that it is more easily used in oil sands processing.

What is needed in the art are methods to reduce greenhouse gas emissions, amount of process water required, length of time for tailing pond reclamation and the amount of petroleum based diluent and chemicals needed in oil sands extraction and processing. A preferred fast pyrolysis process that converts biomass into renewable bio-oil fractions and carbon-rich biochar will improve the environmental sustainability of oil sand extraction and processing when integrated with existing infrastructure.

SUMMARY OF THE INVENTION

The present invention addresses the aforementioned needs in the art, as will now be summarized and then further described in detail below.

Some variations provide a method comprising combining biodiluent with bitumen to form diluted bitumen, wherein the biodiluent comprises a liquid pyrolysis oil obtained from biomass pyrolysis. The liquid pyrolysis oil may comprise at least a portion of an organic phase of a liquid produced during the biomass pyrolysis. The biodiluent is substantially soluble with the bitumen at a processing temperature selected from about 40° C. to about 90° C., in certain embodiments.

In some embodiments, the method further comprises a step of combining diluent with the bitumen to form the diluted bitumen. The addition of the biodiluent can reduce the quantity of the diluent necessary to maintain a selected viscosity of the diluted bitumen.

Some variations provide a method comprising combining biodiluent and diluent with bitumen to form diluted bitumen, wherein the biodiluent comprises a liquid pyrolysis oil obtained from biomass pyrolysis. The liquid pyrolysis oil may comprise at least a portion of an organic phase of a liquid produced during the biomass pyrolysis. The biodiluent may be from 0.1 wt % to 20 wt % of the diluted bitumen, for example.

In some embodiments, diluent is recovered from the diluted bitumen. The recovered diluent may be recycled for use to dilute additional bitumen. In some embodiments, the biodiluent is not recovered from the diluted bitumen.

The method may further include introducing the diluted bitumen to a unit for refining, upgrading, or chemical conversion. In some embodiments, the method comprises converting at least a portion of the biodiluent into fuels, chemicals, materials, or energy. For example, the biodiluent may be converted into bio-based asphalt or bio-based asphalt cement.

Some variations of the invention provide an oil sands refining process comprising:

(a) providing a mined oil sands feedstock;
(b) crushing the mined oil sands feedstock to produce crushed oil sands;
(c) combining the crushed oil sands with water for hydrotransport to a separation section;
(d) operating the separation section to separate crushed oil sands into bitumen, coarse sand, and water containing suspended solids;
(e) introducing the coarse sand and the water containing suspended solids to a tailing pond;
(f) providing a biomass feedstock; and
(g) converting the biomass feedstock in a pyrolysis process to at least one low-water pyrolysis liquid containing less than 10 wt % water, a water-rich pyrolysis liquid, and biochar, wherein the bitumen is diluted with biodiluent comprising the at least one low-water pyrolysis liquid, to form diluted bitumen.

In some embodiments, the process further comprises combining diluent with the bitumen to form the diluted bitumen.

The process may include introducing the diluted bitumen to a unit for refining, upgrading, or chemical conversion. For example, at least a portion of the biodiluent may be converted into fuels, chemicals, materials, or energy, in any combination thereof. In certain embodiments, biodiluent is converted into bio-based asphalt or bio-based asphalt cement.

Some variations of the invention provide an oil sands refining process comprising:

(a) providing an oil sands formation;
(b) extracting bitumen from the oil sands formation using an in-situ extraction method;
(c) providing a biomass feedstock;
(d) converting the biomass feedstock in a pyrolysis process to at least one low-water pyrolysis liquid containing less than 10 wt % water, a water-rich pyrolysis liquid, and biochar; and
(e) combining the extracted bitumen with a biodiluent to form diluted bitumen, wherein the biodiluent comprises the at least one low-water pyrolysis liquid.

In some embodiments, the process further comprises combining the extracted bitumen with a diluent to form the diluted bitumen.

The present invention also provides an integrated process of biomass refining, the process comprising producing at least one low-water pyrolysis liquid, biochar, and a water-rich pyrolysis liquid, wherein the low-water pyrolysis liquid is suitable for use as a refinery feedstock, wherein the biochar is suitable for use as an oil sands tailing stabilization and carbon-sequestration agent, and wherein the water-rich liquid is suitable for reducing water use in oil sands processing. The low-water pyrolysis liquid may be converted into fuels, chemicals, materials, or energy, in various combinations.

In some variations, the invention provides a method comprising combining biodiluent with bitumen to form diluted bitumen, wherein the biodiluent comprises one or more liquid pyrolysis fractions obtained from pyrolyzing biomass and collecting multiple liquid fractions.

In some embodiments, the invention provides a method comprising combining biodiluent and petroleum diluent with bitumen to form diluted bitumen, wherein the biodiluent comprises one or more liquid pyrolysis fractions obtained from fast pyrolysis of biomass, and wherein the petroleum diluent comprises chemicals obtained from crude oil; the method further comprising recovering the petroleum diluent from the diluted bitumen, to form a bitumen-biodiluent mixture, and then recycling the petroleum diluent to combine with the bitumen.

In some embodiments, the invention provides a method comprising combining bitumen with one or more liquid pyrolysis fractions obtained from fast pyrolysis of biomass, wherein the one or more liquid pyrolysis fractions serve as a flotation agent to enhance separation of water and fine solids from the bitumen.

The bitumen may be any source of bitumen, such as (but by no means limited to) bitumen obtained from oil sands, bitumen obtained from bituminous rock, refined bitumen obtained from petroleum, or other sources.

In other variations of the invention, a method of oil sands processing is provided, the method comprising utilizing a water-rich pyrolysis liquid comprising at least 50 wt % water, wherein the water-rich pyrolysis liquid is obtained from a step comprising collecting at least two pyrolysis liquids from biomass fast pyrolysis.

In some embodiments, the invention provides a method of oil sands processing, the method comprising utilizing a water-rich pyrolysis liquid comprising at least 50 wt % water, wherein the water-rich pyrolysis liquid is obtained from a step comprising collecting at least two pyrolysis liquids from biomass fast pyrolysis, and wherein the water-rich pyrolysis liquid is utilized during the method for hydrotransport.

In some embodiments, the invention provides a method of oil sands processing, the method comprising utilizing a water-rich pyrolysis liquid comprising at least 50 wt % water, wherein the water-rich pyrolysis liquid is obtained from a step comprising collecting at least two pyrolysis liquids from biomass fast pyrolysis, and wherein the water-rich pyrolysis liquid is utilized during the method for primary separation of bitumen from the oil sands.

In certain embodiments, the invention provides a method of oil sands processing, the method comprising utilizing a water-rich pyrolysis liquid comprising at least 50 wt % water, wherein the water-rich pyrolysis liquid is obtained from a step comprising collecting at least two pyrolysis liquids from biomass fast pyrolysis, and wherein the water-rich pyrolysis liquid is utilized during the method for modifying pH of one or more liquid streams.

Some embodiments of the invention provide a method of oil sands processing, the method comprising utilizing a water-rich pyrolysis liquid comprising at least 50 wt % water, wherein the water-rich pyrolysis liquid is obtained from a step comprising collecting at least two pyrolysis liquids from biomass fast pyrolysis, the method further comprising recycling water from a tailing pond associated with the oil sands processing.

Biochar may be introduced to an oil sands tailing pond to stabilize or thicken solids contained in the tailing pond; to reduce the reclamation time associated with the tailing pond; to improve the quality of water that is recyclable from the tailing pond; to absorb suspended solids and decrease the amount of mature fine tailings contained in the tailing pond; to remove contaminants and/or toxic materials in the tailing pond; to sequester carbon contained in the biochar; and/or to improve the quality of the soil produced following reclamation of the tailing pond, for example.

The present invention, in some variations, provides an oil sands refining process comprising:
(a) providing a mined oil sands feedstock;
(b) crushing the mined oil sands feedstock to produce crushed oil sands;
(c) combining the crushed oil sands with water for hydrotransport to a separation section;
(d) operating the separation section to separate crushed oil sands into bitumen, coarse sand, and water containing suspended solids;
(e) introducing the coarse sand and the water containing suspended solids to a tailing pond;
(f) providing a biomass feedstock; and
(g) converting the biomass feedstock in a fast pyrolysis and multi-stage separation process to at least one low-water pyrolysis liquid containing less than 10 wt % water, a water-rich pyrolysis liquid containing at least 50 wt % water, and biochar,
wherein the bitumen is diluted with biodiluent comprising the at least one low-water pyrolysis liquid, to form diluted bitumen.

The present invention, in other variations, provides an oil sands refining process comprising:
(a) providing a mined oil sands feedstock;
(b) crushing the mined oil sands feedstock to produce crushed oil sands;
(c) combining the crushed oil sands with water for hydrotransport to a separation section;
(d) operating the separation section to separate crushed oil sands into bitumen, coarse sand, and water containing suspended solids;
(e) introducing the coarse sand and the water containing suspended solids to a tailing pond;
(f) providing a biomass feedstock; and
(g) converting the biomass feedstock in a fast pyrolysis and multi-stage separation process to at least one low-water pyrolysis liquid containing less than 10 wt % water, a water-rich pyrolysis liquid containing at least 50 wt % water, and biochar,
wherein the water-rich pyrolysis liquid is used to displace water or steam use in the oil sands refining process.

The present invention, in still other variations, provides an oil sands refining process comprising:
(a) providing a mined oil sands feedstock;
(b) crushing the mined oil sands feedstock to produce crushed oil sands;
(c) combining the crushed oil sands with water for hydrotransport to a separation section;
(d) operating the separation section to separate crushed oil sands into bitumen, coarse sand, and water containing suspended solids;
(e) introducing the coarse sand and the water containing suspended solids to a tailing pond;
(f) providing a biomass feedstock; and
(g) converting the biomass feedstock in a fast pyrolysis and multi-stage separation process to at least one low-water pyrolysis liquid containing less than 10 wt % water, a water-rich pyrolysis liquid containing at least 50 wt % water, and biochar,
wherein at least a portion of the biochar is introduced, directly or indirectly, to the tailing pond.

The invention, in some variations relating to in-situ oil sands processing, provides an oil sands refining process comprising:
(a) providing an oil sands formation;
(b) extracting bitumen from the oil sands formation using an in-situ extraction method;
(c) providing a biomass feedstock;
(d) converting the biomass feedstock in a fast pyrolysis and multi-stage separation process to at least one low-water pyrolysis liquid containing less than 10 wt % water, a water-rich pyrolysis liquid containing at least 50 wt % water, and biochar; and
(e) combining the extracted bitumen with a biodiluent to form diluted bitumen, wherein the biodiluent comprises the at least one low-water pyrolysis liquid.

The present invention, in other variations, provides an oil sands refining process comprising:
(a) providing an oil sands formation;
(b) extracting bitumen from the oil sands formation using an in-situ extraction method;
(c) providing a biomass feedstock;
(d) converting the biomass feedstock in a fast pyrolysis and multi-stage separation process to at least one low-water pyrolysis liquid containing less than 10 wt % water, a water-rich pyrolysis liquid containing at least 50 wt % water, and biochar; and
(e) combining the extracted bitumen with a diluent to form diluted bitumen,
wherein the water-rich pyrolysis liquid is used to displace water or steam use in the oil sands refining process.

In some variations, the invention enables a process of biomass refining, the process comprising the production of at least one low-water pyrolysis liquid, biochar, and a water-rich pyrolysis liquid, wherein the low-water pyrolysis liquid is suitable for use as a refinery feedstock, the biochar is suitable for use as an oil sands tailing stabilization and carbon-sequestration agent, and the water-rich liquid is suitable for reducing water use in oil sands processing.

The principles of the invention may be utilized to reduce greenhouse-gas emissions and improve sustainability. In some embodiments, integration of a fast pyrolysis and multi-stage separation process into an oil sands refining process reduces the overall greenhouse-gas emissions on a well-to-refined-product basis by at least 10%, 20%, 30%, 40%, 50%, 60%, 70%, or more.

The present invention provides apparatus configured to carry out any of the methods or processes as described.

In some variations, an oil sands refining system comprises:

(a) a crusher for crushing mined oil sands feedstock to produce crushed oil sands;

(b) means for hydrotransporting the crushed oil sands with water to a separation unit;

(c) a separation unit to separate crushed oil sands into bitumen, coarse sand, and water containing suspended solids;

(d) a tailing pond for holding the coarse sand and the water containing suspended solids;

(e) a fast pyrolysis reactor and a multi-stage separator to convert biomass feedstock into at least one low-water pyrolysis liquid containing less than 10 wt % water, a water-rich pyrolysis liquid containing at least 50 wt % water, and biochar; and (f) means for diluting bitumen by combining the bitumen with biodiluent comprising the at least one low-water pyrolysis liquid.

In other variations, an oil sands refining system comprises:

(a) an oil sands formation;

(b) an in-situ extraction zone comprising input and extraction streams for extracting bitumen from the oil sands formation;

(c) a fast pyrolysis reactor and a multi-stage separator to convert biomass feedstock into at least one low-water pyrolysis liquid containing less than 10 wt % water, a water-rich pyrolysis liquid containing at least 50 wt % water, and biochar; and (d) means for diluting bitumen by combining the bitumen with biodiluent comprising the at least one low-water pyrolysis liquid.

This invention also provides various compositions and products. In some embodiments, a diluted bitumen composition comprises bitumen and biodiluent, wherein the biodiluent comprises lignin derivatives, levoglucosan, furans, carbohydrates, acetic acid, syringols, guaiacols, phenols, and water. Certain compositions include bitumen and levoglucosan. Some compositions include bitumen and biomass-derived phenols.

In some embodiments, a diluted bitumen composition includes bitumen and condensed biomass-pyrolysis vapors, or bitumen and electrostatically precipitated biomass-pyrolysis aerosols, or all of these.

In certain embodiments, the invention provides a diluted bitumen composition comprising bitumen, condensed biomass-pyrolysis vapors, electrostatically precipitated biomass-pyrolysis aerosols, and water.

A diluted bitumen composition according to some embodiments includes bitumen and biodiluent, wherein the biodiluent is produced by a process comprising a fast pyrolysis and multi-stage separation process to convert biomass into at least one low-water pyrolysis liquid containing less than 10 wt % water, a water-rich pyrolysis liquid containing at least 50 wt % water, and biochar, wherein the biodiluent comprises the at least one low-water pyrolysis liquid.

Some embodiments provide a composition comprising bitumen, a petroleum-derived diluent, and a biomass-derived diluent.

Some embodiments provide bitumen, a petroleum diluent, and a biodiluent, wherein the biodiluent comprises one or more liquid pyrolysis fractions obtained from fast pyrolysis of biomass.

Certain embodiments provide a composition comprising bitumen, a petroleum diluent, lignin derivatives, levoglucosan, furans, carbohydrates, acetic acid, syringols, guaiacols, phenols, and water. Some embodiments of the invention provide a composition comprising bitumen, a petroleum diluent, and levoglucosan. These or other embodiments provide a composition comprising bitumen, a petroleum diluent, and biomass-derived phenols.

In certain embodiments, a bitumen composition is produced by a process comprising removing a petroleum diluent from a mixture comprising bitumen, the petroleum diluent, and a biodiluent, wherein the biodiluent comprises one or more liquid pyrolysis fractions obtained from fast pyrolysis of biomass.

The invention encompasses a bitumen composition produced by any of the methods or processes as described herein. The invention encompasses an aqueous (i.e., water-rich) composition produced by any of the methods or processes as described herein.

This invention also provides a bio-based asphalt product produced by any of the methods or processes as described herein, and further comprising conversion of an intermediate into the bio-based asphalt product.

This invention also provides a chemical produced by any of the methods or processes as described herein, and further comprising conversion of an intermediate into the chemical.

This invention also provides a material produced by any of the methods or processes as described herein, and further comprising conversion of an intermediate into the material.

This invention further provides a refined fuel produced by any of the methods or processes as described herein, and further comprising conversion of an intermediate into the refined fuel.

BRIEF DESCRIPTION OF THE DRAWINGS

The advantages of the technology described may be better understood by referring to the descriptions below with the accompanying drawings. The drawings are not to scale and represent exemplary configurations that depict general principles of the technology. Dotted lines within the figures are representative of optional process streams.

DETAILED DESCRIPTION OF EMBODIMENTS OF THE INVENTION

Figure 1:
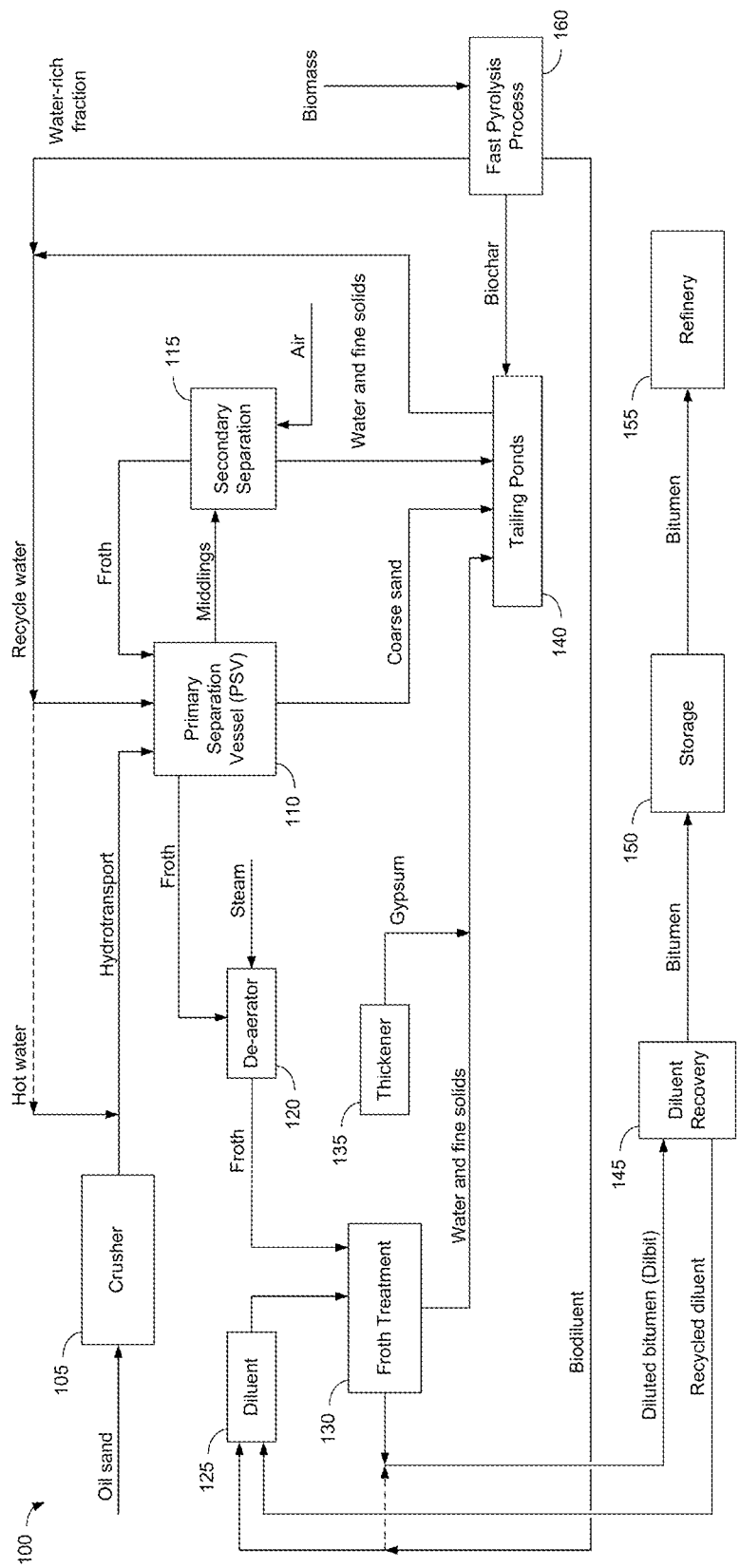
FIG. 1 provides an exemplary oil sands mining extraction process coupled with a fast pyrolysis process that converts biomass into biodiluent to modify bitumen viscosity, a water-rich fraction to reduce fresh water use and biochar to improve stability of tailing ponds, sequester carbon and reduce overall greenhouse gas emission profile.

The apparatus, systems, and methods of the present invention will now be described in detail by reference to various non-limiting embodiments, including the figures which are exemplary only.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The present invention may be practiced by implementing method steps in different orders than as specifically set forth herein. All references to a "step" may include multiple steps (or substeps) within the meaning of a step. Likewise, all references to "steps" in plural form may also be construed as a single process step or various combinations of steps.

The present invention may be practiced by implementing process units in different orders than as specifically set forth herein. All references to a "unit" may include multiple units (or subunits) within the meaning of a unit. Likewise, all references to "units" in plural form may also be construed as a single process unit or various combinations of units.

As used in this specification and the appended claims, the singular forms "a," "an," and "the" include plural referents unless the context clearly indicates otherwise.

Some variations of the present invention consist of an oil sands extraction method coupled with a fast pyrolysis process that produces renewable bio-oil fractions and biochar for the improved sustainability of oil sands processing. The use of fast pyrolysis products in oil sands processing may reduce carbon footprint and improve the environmental image of oil sands bitumen.

"Oil sands," for the purpose of the present invention, is any material that is extracted from the ground with the purpose of recovering viscous hydrocarbon material, bitumen, asphalt, tar, pitch, heavy oil, heavy crude, oil shale, and the like. "Bitumen," for the purpose of the present invention, is a viscous, hydrocarbon material, oil sands bitumen, asphalt, tar, pitch, heavy oil, heavy crude, oil shale, and the like recovered using known extraction methods including but not limited to oil sands processing techniques and used as a crude feedstock in a refinery or upgrader. "Diluent," for the purpose of this present invention, is a hydrocarbon or petroleum substance (often condensate) used to dilute crude bitumen so that it can be transported by pipeline and meet pipeline specifications. Diluents are mainly composed of $C_4$-$C_{10}$ hydrocarbons and small amounts of aromatics including benzene, xylene and toluene and derived from natural gas condensate, crude oil, coal, or other fossil source. "Dilbit," "synbit," "syncrude," for the purpose of the present invention, is a viscous hydrocarbon material such as bitumen combined with diluent to form a lower viscosity or partially upgraded bitumen substance. "Biomass," for the purpose of the present invention, is any material not derived from fossil resources and comprising at least carbon, hydrogen, and oxygen. Biomass includes, for example, plant and plant-derived material, vegetation, agricultural waste, forestry waste, wood waste, and paper waste. "Biodiluent" and "water-rich fraction," for the purpose of the present invention, are liquid products derived from a biomass fast pyrolysis process. In general, biodiluent contains less water than the water-rich fraction. Biodiluent will typically contain less than 10 wt % water while the water-rich fraction may contain between 50-90 wt % water.

Fast pyrolysis is a thermal process in which feedstock is rapidly heated in the absence of oxygen. The feedstock decomposes to generate pyrolysis vapors, aerosols, biochar and non-condensable gas. Fast pyrolysis processes typically produce 60-75 wt % of liquid bio-oil, 15-25 wt % of solid char, and 10-25 wt % of non-condensable gases, depending on the feedstock used (Mohan, Pittman, & Steele, 2006).

Bio-oil is a dark brown, liquid-form of biomass. Also known as pyrolysis oil, biocrude oil, wood oil and pyroligneous acid, it contains a mixture of up to 400 organic compounds. Conventional bio-oil has high water and oxygen content, low energy content, high acidity and general instability. These poor properties prevent it from integrating into existing markets or blending with hydrocarbons without expensive upgrading. Bio-oil, however, can be separated into an aqueous and organic phase using separation techniques. In general, the aqueous phase will contain more water than the organic phase. The "aqueous phase" is a water-rich pyrolysis liquid that will typically contain at least 50 wt % water while the "organic phase" will typically contain less than 10 wt % water. For the purpose of this invention, aqueous phase bio-oil may be functional in water-rich fraction applications and organic phase bio-oil may be functional in biodiluent applications.

Non-condensable gases include hydrogen, carbon monoxide, carbon dioxide, methane, and other light hydrocarbons. Non-condensable gases may also include inert gases used in the pyrolysis reactor. Typically, non-condensable gases represent about 10 wt % to about 25 wt % of pyrolysis products.

Biochar or char is a solid product of biomass pyrolysis. Fast pyrolysis seeks to maximize liquid bio-oil yield and minimize biochar yield. Biomass with high lignin and ash content tend to increase biochar yields while slow heating rates, long vapor residence times and high pressures also lead to additional char formation.

A particular advantage of the present invention is using bio-oil fractions from a preferred fast pyrolysis fractionation process to reduce the GHG emission profile of oil sands bitumen. Bio-oil fractions are collected using simple, low-cost, fractionation technology downstream of biomass fast pyrolysis. Bio-oil fractions have improved properties over conventional bio-oil since much of the water and acidic compounds are separated into a single fraction. Using bio-oil fractions is a new and preferred approach for reducing GHG emissions in oil sand processing for two reasons. One, bio-oil fractions with low water and acidity can be used as a biodiluent and blended with bitumen (conventional bio-oil is not easily blended) to modify viscosity, improve refining operations and reduce GHG profile, and two, the water-rich fraction (containing between 50-90% water) can be used for hydrotransport, steam production and oil sands separation processes to decrease water consumption and chemical use.

In some variations, the present invention incorporates technology described in U.S. Pat. No. 8,100,990 entitled "Methods for Integrated Fast Pyrolysis Processing of Biomass" issued Jan. 24, 2012 to Ellens et al., which is incorporated by reference herein in its entirety.

Oil Sands Mining Extraction

With reference to FIG. 1, the purpose of unit 100 is to recover and process bitumen from mined oil sands located within 0-100 meters of the surface.

The purpose of unit 105 is to receive mined oil sands and crush them to a small, uniform size. Mining oil sands involves clearing away large areas of forest, trees, soil, clay and rock in order to access buried oil sands. Once uncovered, large cranes and trucks mine and transport oil sands to unit 105.

After leaving the crusher in unit 105, oil sands are conveyed using hydrotransport to unit 110. Hot water between 50-80° C. is added to a hydrotransport system to create a slurry and improve pipeline transportation efficiency. During transportation oil sands are further broken into its components.

In a preferred approach, a water-rich pyrolysis oil fraction from unit 160 is heated to 30-80° C. and added to the oil sands for hydrotransport.

The mixture is transported from unit 105 to unit 110, a primary separation vessel. Air may be added to unit 110 to create the bitumen froth. Additional water is added to the primary separation vessel to encourage separation of the oil sands. In a preferred approach, the water-rich fraction is added to unit 110 from unit 160 along with recycle water from unit 140 in order to reduce water consumption. Mining extraction requires three to four barrels of water to produce one barrel of bitumen. On average, between two and three barrels of fresh water are needed while the remaining water is recycled and recovered from tailing ponds.

In unit 110, coarse sand sinks to the bottom, bitumen floats to the top as froth and middlings (mostly water, fine solids and clay with small amounts of bitumen) are suspended in the middle. Coarse sand separated in unit 110 is transported to tailing ponds, unit 140. The middlings undergo a secondary separation in floatation cells, unit 115, where air is added to produce and separate bitumen froth. In one embodiment, the water-rich fraction from unit 160 may be added to unit 115 to further enhance separation. Bitumen froth is recycled from unit 115 back to unit 110. Water and fine solids from unit 115 are sent to tailing ponds, unit 140.

From the primary separation vessel, unit 110, bitumen froth is sent to a de-aerator, unit 120. Steam enters unit 120 to remove bubbles so that bitumen froth may be pumped. In one embodiment the water-rich fraction from unit 160 may be used as a feedstock to create steam for unit 120.

De-aerated froth is pumped from unit 120 to unit 130, for froth treatment. The purpose of unit 130 is to further remove water and fine solids from bitumen. Hydrocarbon diluent and chemicals are added from unit 125 to unit 130 to enhance separation and decrease bitumen viscosity. Diluent or condensates are used to reduce the viscosity of bitumen for pumping and meet pipeline specifications. Diluents are mainly composed of $C_4$-$C_{10}$ hydrocarbons and small amounts of aromatics including benzene, xylene and toluene.

In a preferred embodiment, biodiluent and/or pyrolysis oil derived chemicals from unit 160 are added to unit 125 in addition to hydrocarbon diluent in unit 130, froth treatment. The biodiluent serves to modify bitumen viscosity and lower GHG emission profile by displacing petroleum derived products. Biodiluent can reduce the viscosity of the bitumen and therefore the amount of hydrocarbon diluent needed to meet pipeline specifications. Biodiluent, the water-rich pyrolysis oil fraction and pyrolysis oil derived chemicals may also serve as floatation agents to enhance water and fine solid separation from bitumen.

In an alternative embodiment, biodiluent and/or pyrolysis oil derived chemicals from unit 160 are added to the diluted bitumen stream after unit 130 and before unit 145. In yet another embodiment, biodiuent and/or pyrolysis oil chemicals derived from unit 160 are added to the bitumen stream after unit 145.

Water and fine solids leave unit 130 and are mixed with a thickener (often gypsum) from unit 135 before entering tailing ponds, unit 140. Tailing ponds from mined oil sands are used to retain sand, clay and water from mining extraction. Tailing ponds also act as settling ponds where sand and fine solids separate by gravity from water. Over time, clean water ends up on top of the pond where it is recycled into unit 110 or other processes requiring water. Coarse sand sinks to the bottom of unit 140. Between the clean water and sand is a stable layer of mature fine tailings (MFT) or solids perpetually suspended in water. Tailing pond research is focused on removing solids from MFT, drying the tailings so they become stable enough to support surface traffic and are able to be reclaimed, and reducing the time required for tailing pond reclamation. Gypsum is added to thicken the tailings so that it releases water more quickly. Other prior art related to the tailing pond reclamation process involves running the mature fine tailings through a centrifuge. Another process involves releasing sand, water and fine solids to runoff down an embankment so that the fine solids are filtered or caught up before reaching the tailing pond below.

In a preferred approach, biochar from unit 160 is added to unit 140 as a material that will improve tailing pond reclamation process, provide increased accessibility to water for recycling, sequester carbon and reduce oil sand processing GHG emission profile. In another embodiment, biochar from unit 160 is added to unit 135 to serve as a thickener. Biochar is composed mainly of carbon. When mixed with tailings, biochar coalesces or absorbs fine solids in its highly porous structure to decrease the amount of mature fine tailings increasing the amount of clean reclaim water on top of the pond. Once the water layer is removed, biochar may reduce the time required to dry the tailings and provide a stable, trafficable layer for equipment to begin reclamation.

Biochar's high porosity may also remove contaminants from the soil and absorb toxic material in tailing ponds. Additionally, adding carbon-rich biochar to the tailings sequesters once atmospheric carbon to decrease oil sand carbon emission profile and improve soil quality of reclaimed tailings.

Oil Sands In Situ Extraction

Figure 2:
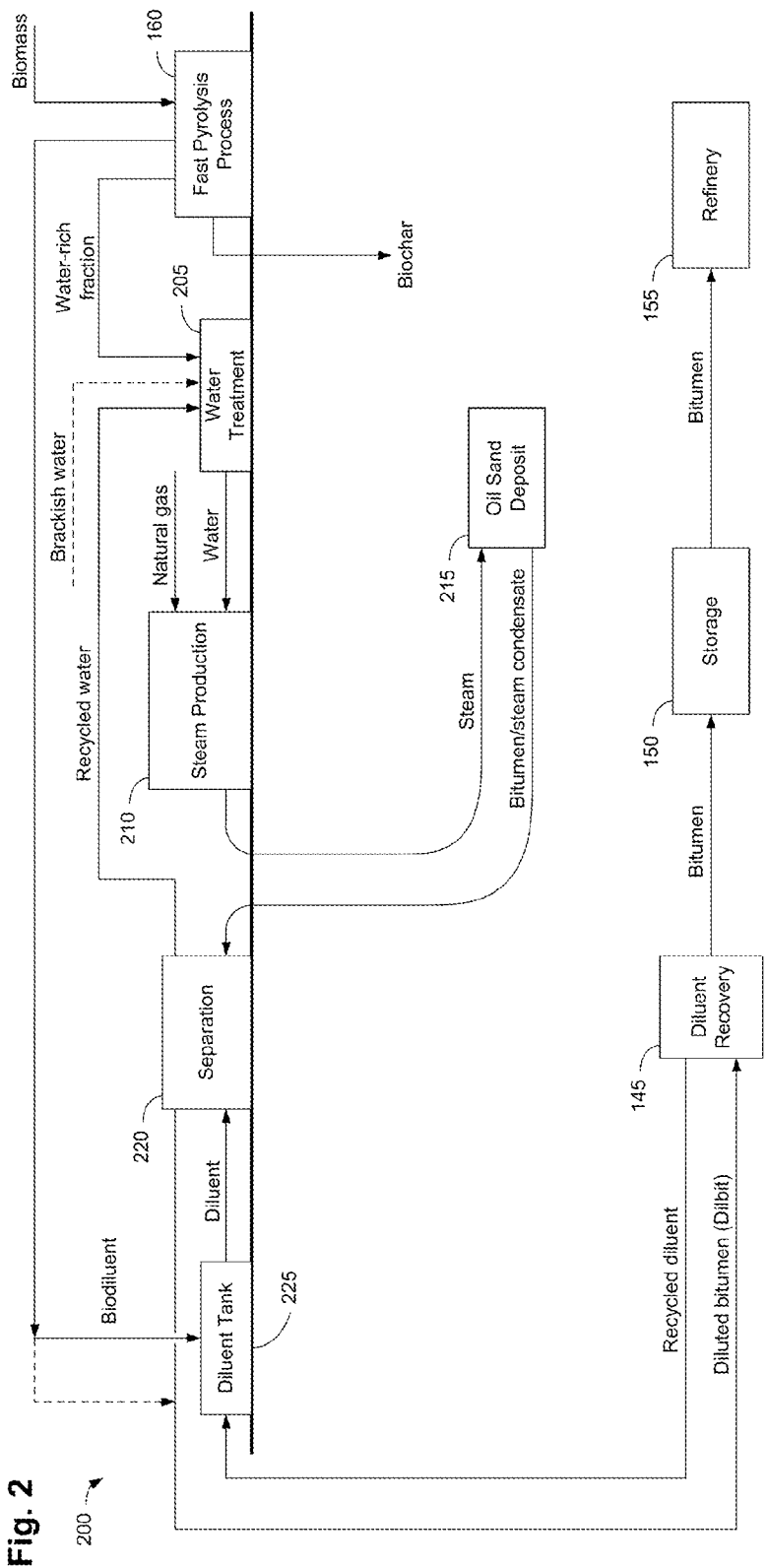
FIG. 2 provides an exemplary oil sands in situ extraction process coupled with a fast pyrolysis process that converts biomass into biodiluent to modify bitumen viscosity, a water-rich fraction to reduce water need for steam production and biochar to sequester carbon and reduce overall greenhouse gas emission profile.

With reference to FIG. 2, the purpose of unit 200 is to extract bitumen located more than 75 meters below the surface using an in situ process. Steam-assisted, gravity-drainage (SAGD) is a common in situ method that uses two parallel, horizontal wells drilled up to 300-600 meters below the surface to recover bitumen. Although SAGD is an exemplary in situ extraction method the present invention is by no means limited to this in situ process. Other in situ extraction processes that may benefit from fast pyrolysis products include but are not limited to, Cyclic Steam Stimulation (CSS), Electro-Thermal Dynamic Stripping Process (ET-DSP™), Toe to Heal Air Injection (THAI), Combustion Overhead Gravity Drainage (COGD), Solvent Extraction (N-Solv, etc.) and others.

In situ methods extract only bitumen from the ground and therefore do not require tailing ponds to retain sand, water and fine solids. In situ recovery is more water efficient than mining extraction using one barrel of water per barrel of bitumen. Furthermore, brackish or saline water can be used for the in situ process.

The purpose of unit 205 is to treat process water before it can be converted into steam in unit 210. Brackish or saline water as well as fresh water is cleaned and treated before entering steam production, unit 210. In a preferred approach, the water-rich pyrolysis oil fraction, which contains up to 90% water, is fed from the fast pyrolysis process, unit 160, into unit 205 where it is treated. Using the water-rich fraction from unit 160 reduces the need for fresh water. Furthermore, producing the water-rich fraction does not require additional water which is used for post production separation of conventional bio-oil into aqueous and organic phases.

Treated water from unit 205 is then sent to steam production, unit 210. Natural gas or another fuel including bio-oil fractions are combusted to provide heat for steam production. In one embodiment the water-rich fraction from unit 160 is fed directly to unit 210 to serve as a feedstock for steam production.

Steam or solvents from unit 210 are pumped into the upper horizontal well located about 4.5 meters above the lower in unit 215. The hot steam heats oil sands in unit 215 so that the bitumen melts and seeps down into the bottom well by gravity where it is pumped out of unit 215 with steam condensate to unit 220. Alternatively, solvents are pumped into unit 215 to dissolve bitumen and reduce its viscosity. Low viscosity bitumen drains into the lower well and is similarly pumped out of unit 215 to unit 220 above ground.

In unit 220, bitumen is separated from steam condensate and mixed with diluents. Steam condensate is recovered as recycle water that must be treated in unit 205 before it can be turned into steam again. Diluent is added to unit 220 from unit 225 to reduce the viscosity of the bitumen for pipeline transportation. In a preferred embodiment, biodiluent and/or pyrolysis oil derived chemicals from unit 160 are added to unit 225 to modify the viscosity. This can reduce the amount of hydrocarbon diluent needed in unit 220 and add renewable carbon to bitumen to reduce overall GHG emission profile.

In an alternative embodiment, biodiluent and/or pyrolysis oil derived chemicals from unit 160 are added to the diluted bitumen stream after unit 220 and before unit 145. In yet another embodiment, biodiluent and/or pyrolysis oil chemicals derived from unit 160 is added to the bitumen stream after unit 145.

In conjunction with biochar carbon sequestration, adding 2-5% vol. biodiluent to bitumen can achieve significant GHG emission reduction of oil sands processing (Table 1) on a Well-to-Refined Product basis.

With reference to FIGS. 1 and 2, the process after units 130 and 220 are the same. Diluted bitumen or dilbit (containing biodiluent) from the froth treatment plant, unit 130, and from separation, unit 220 is pumped to a refinery or upgrader. Hydrocarbon diluent is recovered in unit 145 located at the refinery or upgrader. Here diluent is separated from bitumen and may be recycled back to the extraction site into units 125 and 225.

Bitumen recovered in unit 145 is stored in large storage tanks, unit 150, until further processing at the refinery, unit 155, into synthetic crude oil or other upgraded products. Alternatively, diluted bitumen from unit 130 or 220 is first stored in unit 150 at the refinery or upgrader site before it is separated in diluent recovery, unit 145 en route to the refinery or upgrader, unit 155.

In a preferred approach, biodiluent mixed with bitumen or diluted bitumen from unit 130 or 220 is not recovered with hydrocarbon diluents in unit 145 but kept with the bitumen in storage, unit 150 and then transported to a refinery or upgrader in unit 155. By mixing biodiluent with bitumen, renewable carbon content is added so that the GHG emission profile is reduced creating an environmentally friendly and improved sustainability oil sands process.

Laboratory testing has demonstrated that biodiluent from the fast pyrolysis fractionation process in unit 160 blends with petroleum asphalt bitumen and crude oil. Due to the presence of high molecular weight and boiling point compounds, it is expected that some or all the biodiluent will pass through diluent recovery, unit 145 and remain with the bitumen. Furthermore, it is expected that as biodiluent enters the refinery or upgrader, unit 155, it will form at least a portion of renewable asphalt cement or bioasphalt. Renewable asphalt cement is able to sequester carbon in asphalt further reducing oil sands processing GHG emissions profile.

Alternatively, biodiluent or a portion of the biodiluent processed in the refinery or upgrader, unit 155, may produce renewable hydrocarbon compounds other than asphalt cement, such as fuels and chemicals.

Fast Pyrolysis and Bio-Oil Fractionation Process

In a preferred approach, unit 160 is described in U.S. Pat. No. 8,100,990 entitled "Methods for Integrated Fast Pyrolysis Processing of Biomass" issued Jan. 24, 2012 to Ellens et al., which is incorporated by reference herein in its entirety.

Unit 160 provides a method for pretreating and converting biomass into liquid bio-oil fractions, solid biochar, and non-condensable gas using a fast pyrolysis process. These products are collected, processed, produced and recycled or stored on site. The operation of unit 160 is integral to the production of value-added products including renewable biodiluent, a water-rich pyrolysis oil fraction, biochar and bioasphalt which can reduce oil sands GHG emission profile as noted.

In another approach, unit 160 is a biomass fast pyrolysis processing facility producing whole bio-oil, biochar and non-condensable gas. In this embodiment, whole bio-oil is separated into its organic and aqueous phases which may be used in a manner similar to biodiluent and the water-rich pyrolysis oil fraction, respectively.

In a preferred approach, the fast pyrolysis process, unit 160, is co-located with an oil sands site so as to provide mutual benefit to one another and add another level of integration. Co-location of a fast pyrolysis processing plant with

TABLE 1

Reduced emissions with biodiluent on Well-to-Refined Product (WtRP) basis

| Canadian Oil Sands Source | WtRP emissions (kg CO2e/bbl refined product)* | Increase in WtRP emissions over "Average US Crude" | WtRP emissions adding 2%-vol. biodiluent (% Reduction) | WtRP emissions adding 5%-vol. biodiluent (% Reduction) |
|---|---|---|---|---|
| SAGD SCO | 168.5 | +66.8% | +59.6% (−10.8%) | +48.8% (−27.0%) |
| Mining SCO | 132.5 | +31.2% | +24.7% (−20.8%) | +15.0% (−52.0%) |
| SAGD Dilbit | 125.5 | +24.3% | +17.9% (−26.2%) | +8.4% (−65.5%) |
| Mining Bitumen | 123.5 | +22.3% | +16.0% (−28.3%) | +6.5% (−70.9%) |
| Average US Crude Consumed (2005) | 101.0 | 0.0 | — | — |

*Reference: IHS CERA Special Report (2010): Oil Sands, Greenhouse Gases, and US Oil Supply - Getting the Numbers Right.

an oil sand processor may provide access to utilities and auxiliary infrastructure.

The integrated fast pyrolysis process is able to use many different feedstocks including lignocellulosic biomass and other carbon-based energy sources. In certain approaches, the fast pyrolysis process uses locally sourced biomass available around the oil sand extraction site especially considering the availability of wood resources in Western Canada (Levelton Consultants Ltd and Envirochem Srevices Inc., 2008).

In another approach, co-locating an integrated fast pyrolysis process with fractionation technology, as depicted in FIGS. 1 and 2, may reduce oil sands processing life-cycle analysis or greenhouse gas (GHG) footprint. Fast pyrolysis products can offset fossil resource use at a processing facility. Reducing natural gas, coal, diesel and other fossil resources with renewable products is a way to meet renewable energy mandates, renewable portfolio standards, reduce carbon footprint and dependence on fossil sources while improving sustainability.

In a preferred approach, the fast pyrolysis process, unit 160, converts biomass into oil sands compatible products that can be integrated to reduce GHG emission profile. When integrated with oil sands extraction and processing, biodiluent, biochar, the water-rich fraction and/or pyrolysis oil derived chemicals products improve the sustainability of the industry. The fast pyrolysis process, unit 160, may share utilities such as natural gas, steam, water and electricity to convert local biomass materials into renewable products that reduce oil sands GHG emission profile, environmental criticism and provide other benefits discussed.

Biodiluent, biochar, the water-rich fraction and/or pyrolysis oil derived chemicals produced at or near oil sand processing sites can effectively transform the oil sands industry. This process is an improvement over conventional pyrolysis processes since bio-oil is separated into distinct fractions that can be used to enhance aspects of the oil sands extraction process. Conventional bio-oil is not compatible with hydrocarbons or the oil sands extraction process as described though it may be separated into aqueous and organic fractions which may have a degree of compatibility.

EXAMPLES

The Examples set forth below are for illustrative purposes only and are not intended to limit, in any way, the scope of the present invention.

Example 1

Petroleum Diluent Reduction

Simulated oil sands bitumen, biodiluent and hydrocarbon diluent blends were created and analyzed to determine pipeline quality. A sample of Western Canadian Select (WCS) diluted crude was heated to 210° C. and distilled at atmospheric conditions to remove hydrocarbon diluent and recover crude according to modified ASTM D2892. Asphalt binder (PG 58-22) was heated on a hot plate until liquid and added to the recovered crude to create a simulated oil sands bitumen (65 wt % asphalt binder and 35 wt % bitumen) with a viscosity profile similar to a typical Athabasca bitumen (Attanasi & Meyer, 2007).

A particular biodiluent mixture was produced by heating and combining wood-derived pyrolysis oil fractions 1 through 4. The fractions were produced using a pilot scale fast pyrolysis system described in U.S. Pat. No. 8,100,990.

The density and viscosity profile of the simulated bitumen, biodiluent and recovered petroleum diluent are found in Table 2.

TABLE 2

Density and viscosity profile of bitumen, biodiluent and petroleum diluent

|  | Temperature (° C.) | Bitumen | Biodiluent | Diluent |
|---|---|---|---|---|
| Density[1] (kg/m$^3$) | 15.5 | 1,007 | 1,290 | 673 |
| Viscosity[2] (cSt) | 7 | 19,805,228 | 43,656,599 | <1 |
|  | 12 | 6,993,377 | 9,024,466 | — |
|  | 20 | 1,559,845 | 1,012,808 | — |
|  | 30 | 306,020 | 106,218 | — |
|  | 40 | 75,573 | 18,200 | — |
|  | 50 | 22,337 | 3,809 | — |
|  | 60 | 7,942 | — | — |

[1]Density determined using ASTM D70 for bitumen and biodiluent and mass divided by volume for diluent.
[2]Kinematic viscosity (cP) determined using Brookfield rotational viscometer (DV II + Pro) and converted into cSt.
Italicized numbers extrapolated following ASTM D341.

Various biodiluted bitumen samples were created containing 0, 2, 5 or 10 wt % biodiluent. These are denoted as bitumen, bitumen 98/2, bitumen 95/5, and bitumen 90/10. Four additional blends were made from each biodiluted bitumen sample containing 15, 20, 25 or 27 wt % hydrocarbon diluent. These are denoted as bitumen 15%, bitumen 98/2 15%, bitumen 95/5 15%, bitumen 90/10 15%, etc, The viscosity of each blend was determined at 7, 12, 20, 30 and 40° C. to cover the range of pipeline reference temperatures (Equalization Steering Committee, 2012) and compared to the baseline simulated bitumen sample containing 0 wt % biodiluent (Table 3).

TABLE 3

Blend viscosity at various temperatures and hydrocarbon diluent concentrations

| Diluent Concentration (wt %) | Reference Temperature (° C.) | Bitumen Viscosity (cSt) | Bitumen 98/2 Viscosity (cSt) | Bitumen 95/5 Viscosity (cSt) | Bitumen 90/10 Viscosity (cSt) |
|---|---|---|---|---|---|
| 15 | 7 | 36,776 | 7,151 | 9,401 | 8,245 |
|  | 12 | 16,351 | 4,231 | 4,907 | 4,143 |
|  | 20 | 4,440 | 2,006 | 2,185 | 1,893 |
|  | 30 | 1,724 | 832 | 959 | 840 |
|  | 40 | 789 | 408 | 446 | 405 |

TABLE 3-continued

Blend viscosity at various temperatures and hydrocarbon diluent concentrations

| Diluent Concentration (wt %) | Reference Temperature (° C.) | Bitumen Viscosity (cSt) | Bitumen 98/2 Viscosity (cSt) | Bitumen 95/5 Viscosity (cSt) | Bitumen 90/10 Viscosity (cSt) |
|---|---|---|---|---|---|
| 20 | 7 | 3,700 | 1,767 | 1,606 | 1,203 |
|    | 12 | 1,648 | 1,085 | 982 | 773 |
|    | 20 | 845 | 571 | 520 | 425 |
|    | 30 | 407 | 286 | 260 | 223 |
|    | 40 | 211 | 153 | 144 | 125 |
| 25 | 7 | 606 | 455 | 446 | 351 |
|    | 12 | 425 | 318 | 320 | 252 |
|    | 20 | 248 | 187 | 187 | 151 |
|    | 30 | 135 | 107 | 105 | 88 |
|    | 40 | 81 | 64 | 64 | 55 |
| 27 | 7 | 496 | 366 | 305 | 281 |
|    | 12 | 357 | 263 | 215 | 200 |
|    | 20 | 210 | 155 | 129 | 124 |
|    | 30 | 116 | 91 | 77 | 74 |
|    | 40 | 69 | 56 | 48 | 47 |

Figure 3:
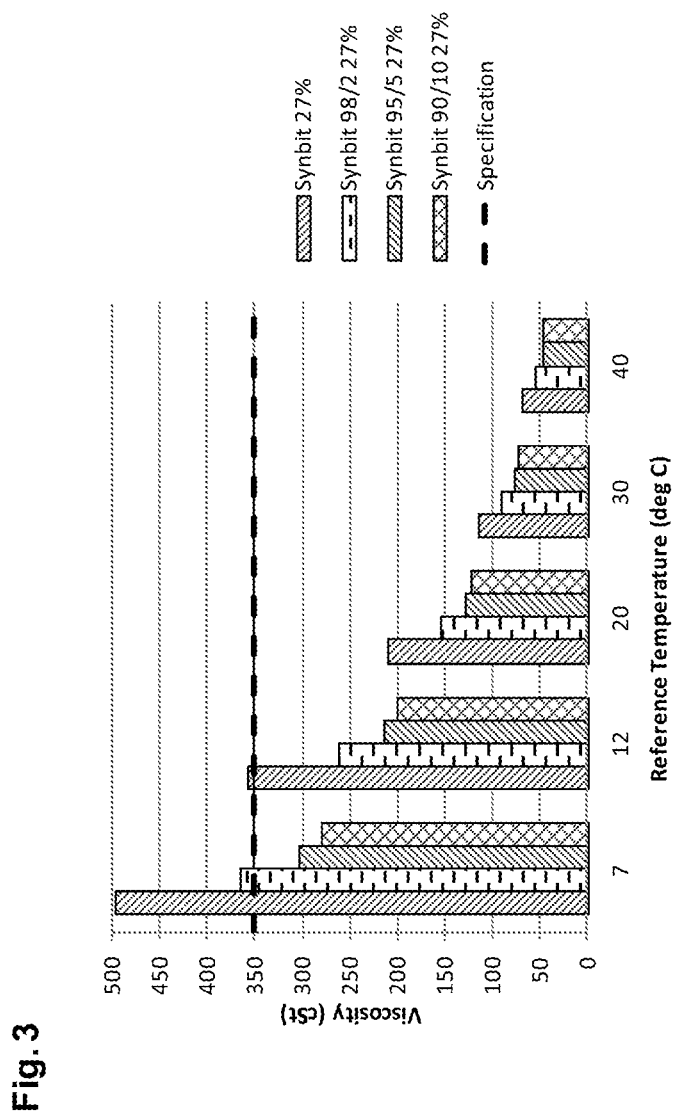
FIG. 3 demonstrates the ability to reduce petroleum diluent and meet pipeline viscosity specifications by adding various concentrations of biodiluent. Samples with increasing biodiluent concentration indicate decreasing viscosity though all samples contain 27 wt % petroleum diluent.

Samples containing biodiluent had notably lower viscosities than the baseline simulated bitumen sample containing 0 wt % biodiluent and an equivalent amount of petroleum diluent. FIG. 3 shows how biodiluent containing blends containing 27 wt % hydrocarbon diluent can meet the pipeline viscosity specification at nearly all reference temperatures while additional diluent is needed for bitumen 27% to comply.

A power regression model was fit to the viscosity data for each blend. Using the model equation, we mathematically determined the amount of diluent each blend requires to meet the 350 cSt maximum pipeline viscosity specification. The percent reduction of hydrocarbon diluent compared to the baseline simulated bitumen containing 0 wt % biodiluent was also determined. Table 4 indicates that this particular biodiluent can reduce the amount of hydrocarbon diluent between 3.7-14.0% depending on temperature and biodiluent concentration.

TABLE 4

Minimum amount of hydrocarbon diluent required to comply with 350 cSt maximum pipeline viscosity and percentage reduction corresponding to baseline simulated bitumen

| Reference Temperature (° C.) | Bitumen Diluent (wt %) | Bitumen 98/2 | | Bitumen 95/5 | | Bitumen 90/10 | | Average Reduction % |
|---|---|---|---|---|---|---|---|---|
| | | Diluent (wt %) | Reduction % | Diluent (wt %) | Reduction % | Diluent (wt %) | Reduction % | |
| 7 | 27.6 | 26.6 | −3.7 | 25.6 | −7.4 | 25.4 | −8.2 | −6.4 |
| 12 | 26.2 | 24.9 | −5.0 | 24.1 | −8.1 | 23.8 | −9.3 | −7.5 |
| 20 | 23.7 | 22.1 | −7.0 | 21.6 | −9.0 | 21.2 | −10.6 | −8.9 |
| 30 | 20.8 | 18.8 | −9.7 | 18.8 | −9.6 | 18.3 | −12.0 | −10.4 |
| 40 | 18.0 | 15.7 | −12.7 | 15.9 | −11.3 | 15.4 | −14.0 | −12.7 |

Example 2

Simulated Bitumen and Biodiluent Blend Density and Viscosity Profiles

Simulated bitumen and biodiluent blends were created to determine their viscosity profile without hydrocarbon diluent. A sample of Western Canadian Select (WCS) diluted crude was heated to 210° C. and distilled at atmospheric conditions to remove hydrocarbon diluent and recover crude according to modified ASTM D2892. Asphalt binder (PG 58-22) was heated on a hot plate until liquid and added to the recovered crude to create a simulated oil sands bitumen (65 wt % asphalt binder and 35 wt % bitumen) with a viscosity profile similar to a typical Athabasca bitumen (Attanasi & Meyer, 2007).

A particular biodiluent mixture was produced by heating and combining wood-derived pyrolysis oil fractions 1 through 4. The fractions were produced using a pilot scale fast pyrolysis system described in U.S. Pat. No. 8,100,990.

Various biodiluted bitumen samples were created containing 0, 2, 5 or 10 wt % biodiluent. These are denoted as bitumen, bitumen 98/2, bitumen 95/5, and bitumen 90/10. The density and viscosity profile of the simulated bitumen and biodiluent blends are found in Table 5. The table indicates that even though biodiluent may have a substantially higher viscosity profile on its own, when 2, 5 and 10 wt % biodiluent is added to simulated bitumen the blend viscosity tends to decrease. When hydrocarbon diluent is added, this trend is propagated as shown in Example 1. Furthermore, adding 2-10 wt % biodiluent to the original bitumen can result in substantial carbon emission reductions and improve the GHG emission profile of the oil sands industry.

It should be noted that additional biodiluent combinations can be produced by combining various pyrolysis oil fractions. Lower viscosity biodiluents will likely reduce the amount of hydrocarbon diluent further and can be used with lower viscosity bitumens including Cold Lake and Lloydminster heavy oil (Speight, 2005). Density is not expected to be a limiting factor since bitumen and hydrocarbon diluent blends have traditionally been limited by viscosity before density (Advantage Insight Group, 2007).

TABLE 5

Density and viscosity profile of bitumen and biodiluent

| | Temperature (° C.) | Biodiluent | Bitumen | Bitumen 98/2 | Bitumen 95/5 | Bitumen 90/10 |
|---|---|---|---|---|---|---|
| Density[1] (kg/m$^3$) | 15 | 1,290 | 1,007 | 1,013 | 1,023 | 1,037 |
| Viscosity[2] (cSt) | 7 | *43,656,599* | *19,805,228* | *19,993,455* | *18,810,932* | *18,027,553* |
| | 12 | *9,024,466* | *6,993,377* | *6,989,799* | *6,573,526* | *6,341,717* |
| | 20 | *1,012,808* | *1,559,845* | *1,538,568* | *1,446,789* | *1,408,485* |
| | 30 | 106,218 | 306,020 | 298,046 | 280,450 | 275,526 |
| | 40 | 18,200 | 75,573 | 72,922 | 68,704 | 67,982 |
| | 50 | 3,809 | 22,337 | 21,469 | 20,171 | 20,129 |
| | 60 | — | 7,942 | 7,576 | 7,164 | 7,160 |

[1]Density determined using ASTM D70 for biodiluent and bitumen; mathematically calculated for blends.
[2]Kinematic viscosity (cP) determined using Brookfield rotational viscometer (DV II+ Pro) and converted into cSt. Italicized numbers extrapolated following ASTM D341.

In this description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the principles of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above provide an indication of the utility and versatility of the present invention. Other embodiments that do not provide all of the features and advantages set forth herein may also be utilized, without departing from the spirit and scope of the present invention. Such modifications and variations are considered to be within the scope of the principles of the invention defined by the claims.

REFERENCES

Advantage Insight Group. (2007). *Analysis of Blending Data Used In the Condensate EQ Model*. Canadian Association of Petroleum Producers, Calgary, AB.

Attanasi, E., & Meyer, R. (2007). Natural bitumen and extra-heavy oil. In J. Trinnaman, & A. Clarke (Eds.), 2007 *Survey of Energy Resources* (pp. 119-143). World Energy Council.

Cackette, L. (2011). *An Overview of the Low Carbon Fuel Standard (LCFS)*. Renewable Energy Institute International.

Equalization Steering Committee. (2012). *Canadian Association of Petroleum Producers*. Retrieved from http://www.capp.ca/library/relatedLinks/Pages/EqualizationSteeringCommittee.aspx Hobbs, D., Brukhard, J., Gross, S., Forrest, J., & Groode, T. A. (2010). *Oil Sands, Greenhouse Gases, and US Oil Supply: Getting the Numbers Right*. Cambridge: IHS Cambridge Energy Research Associates.

Levelton Consultants Ltd and Envirochem Srevices Inc. (2008). *Feasibility Study: Identifying Economic Opportunities for Bugwood and Other Biomass Resources in Alberta and BC*. Edmonton, AB.: Alberta Energy Research Institute.

Mohan, D., Pittman, C., & Steele, P. (2006). Pyrolysis of Wood/Biomass for Bio-oil: A Critical Review. *Energy and Fuels,* 20, 848-889.

Oil Sands Discovery Centre. (2009). *Facts about Alberta's oil sands and its industry*. Retrieved from Government of Alberta Oil Sands Resources: http://history.alberta.ca/oilsands/resources/resources.aspx Schramm, L., Stasiuk, E., Yarranton, H., Maini, B., & Shelfantook, B. (2001). Temperature Effects in the Conditioning and Floatation of Bitumen From Oil Sands in Terms of Oil Recovery and Physical Properties. *Canadian International Petroleum Conference*. Calgary, AB: Petroleum Society.

Shell Canada Limited. (2009). *Shell and the Canadian Oil Sands 2009 Fact Book*. Calgary, AB.

Speight, J. (2005). Natural Bitumen (Tar Sands) and Heavy Oil. In G. Jinsheng, Coal, *Oil Shale, Natural Bitumen, Heavy Oil and Peat, from Encyclopedia of Life Support Systems (EOLSS)*. Oxford: UNESCO, EOLSS.

What is claimed is:

1. A method comprising combining biodiluent with bitumen to form diluted bitumen, wherein said biodiluent comprises a liquid pyrolysis oil obtained from biomass pyrolysis, and wherein said biodiluent contains less than 10 wt % water.

2. The method of claim 1, wherein said liquid pyrolysis oil comprises at least a portion of an organic phase of a liquid produced during said biomass pyrolysis.

3. The method of claim 1, wherein said biodiluent is substantially soluble with said bitumen at a processing temperature selected from about 40° C. to about 90° C.

4. The method of claim 1, said method further comprising a step of combining diluent with said bitumen to form said diluted bitumen.

5. The method of claim 4, wherein the addition of said biodiluent reduces the quantity of said diluent necessary to maintain a selected viscosity of said diluted bitumen.

6. A method comprising combining biodiluent and diluent with bitumen to form diluted bitumen, wherein said biodiluent comprises a liquid pyrolysis oil obtained from biomass pyrolysis, and wherein said biodiluent contains less than 10 wt % water.

7. The method of claim 6, wherein said liquid pyrolysis oil comprises at least a portion of an organic phase of a liquid produced during said biomass pyrolysis.

8. The method of claim 6, wherein said biodiluent is from 0.1 wt % to 20 wt % of the total of said diluted bitumen.

9. The method of claim 6, said method further comprising recovering said diluent from said diluted bitumen, and then recycling said diluent.

10. The method of claim 6, wherein said biodiluent is not recovered from said diluted bitumen.

11. The method of claim 6, said method further comprising introducing said diluted bitumen to a unit for refining, upgrading, or chemical conversion.

12. The method of claim 11, said method comprising converting at least a portion of said biodiluent into fuels, chemicals, materials, or energy.

13. The method of claim 12, said method comprising converting at least a portion of said biodiluent into bio-based asphalt or bio-based asphalt cement.

\* \* \* \* \*